(12) United States Patent
Renard

(10) Patent No.: US 7,817,059 B2
(45) Date of Patent: Oct. 19, 2010

(54) APPARATUS FOR PRODUCING AN ELECTRIC SIGNAL PROVIDED WITH LUMINOUS MEANS CHARACTERIZING SAID SIGNAL

(75) Inventor: Francis Renard, Saint Bartelemy D'Anjou (FR)

(73) Assignee: Thomson Licensing, Boulogne-Billancourt (FR)

( * ) Notice: Subject to any disclaimer, the term of this patent is extended or adjusted under 35 U.S.C. 154(b) by 301 days.

(21) Appl. No.: 11/988,319

(22) PCT Filed: Jul. 4, 2006

(86) PCT No.: PCT/EP2006/063878

§ 371 (c)(1), (2), (4) Date: Jan. 4, 2008

(87) PCT Pub. No.: WO2007/003647

PCT Pub. Date: Jan. 11, 2007

(65) Prior Publication Data

US 2009/0040064 A1    Feb. 12, 2009

(30) Foreign Application Priority Data

Jul. 6, 2005    (FR)   ................................... 05 52070

(51) Int. Cl.
     *G08B 5/00*      (2006.01)
(52) U.S. Cl. ............................... 340/815.4; 340/815.43; 340/660; 340/636.15; 359/889
(58) Field of Classification Search ............... 340/815.4, 340/815.43, 500, 540, 660, 636.15; 307/149, 307/153; 700/297, 298; 359/889
See application file for complete search history.

(56) References Cited

U.S. PATENT DOCUMENTS

| | | | |
|---|---|---|---|
| 5,588,873 A | 12/1996 | Hamai et al. | |
| 5,708,551 A | 1/1998 | Bosatelli | |
| 5,739,673 A | 4/1998 | Le Van Suu | |
| 5,771,471 A * | 6/1998 | Alberth et al. | ............... 455/573 |
| 6,113,281 A | 9/2000 | Davis | |
| 6,266,261 B1 * | 7/2001 | Lanni | .......................... 363/144 |
| 6,281,606 B1 * | 8/2001 | Westlake | ..................... 307/125 |
| 7,043,380 B2 * | 5/2006 | Rodenberg et al. | ............ 702/62 |
| 7,450,390 B2 * | 11/2008 | Lanni | .......................... 361/719 |
| 7,489,105 B2 * | 2/2009 | Weinstein et al. | ........... 320/114 |
| 2003/0042881 A1 | 3/2003 | Lanni | |
| 2004/0001526 A1 | 1/2004 | Hoffer et al. | |
| 2004/0242087 A1 | 12/2004 | Hoshina | |

OTHER PUBLICATIONS

Search Report Dated Sep. 7, 2006.

* cited by examiner

*Primary Examiner*—Davetta W Goins
(74) *Attorney, Agent, or Firm*—Robert D. Shedd; Jeffrey M. Navon

(57) ABSTRACT

The invention relates to a device supplying an electrical signal for which a characteristic, for example, the voltage is adjustable. The device has a connector at one end of a cable to supply this signal to another electrical device. This connector comprises a transmission means of a light signal for which a visible characteristic depends upon the electrical signal produced. One improvement consists in the light signal coming from a source of white light that is colour modulated by filters. These filters are mechanically integrated into a mobile part belonging to the adjustment means of the signal supplied. The invention also relates to a system comprising the device supplying the signal and the device to be connected, the latter device features a mark identifying the light signal compatible with the electrical signal to receive.

9 Claims, 3 Drawing Sheets

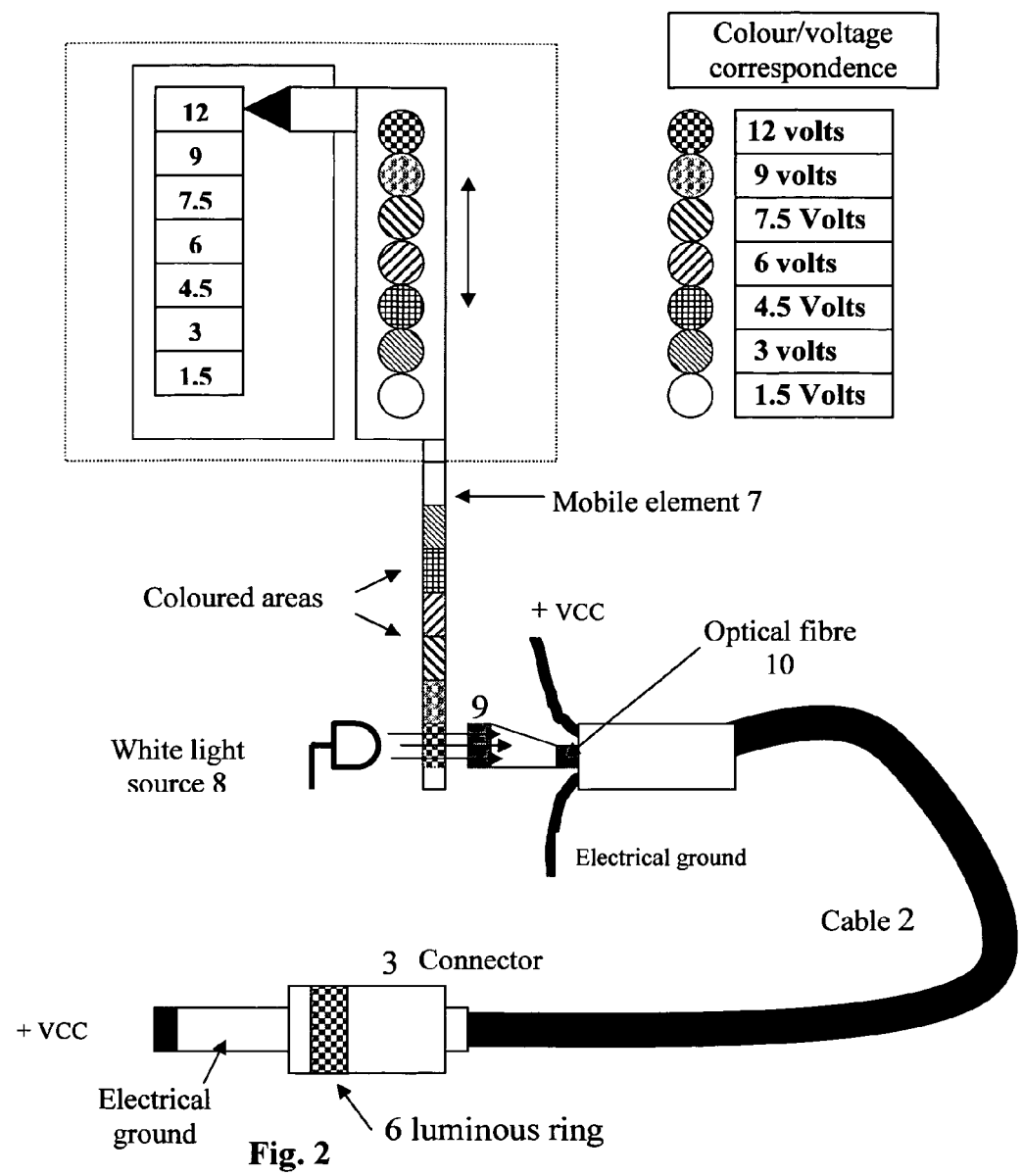
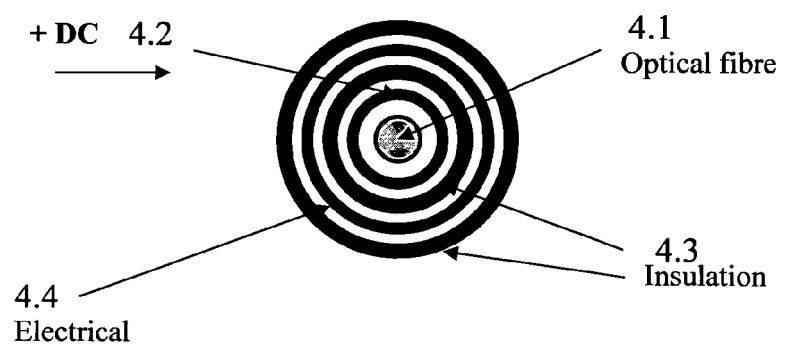
Fig. 2
Fig. 4

APPARATUS FOR PRODUCING AN ELECTRIC SIGNAL PROVIDED WITH LUMINOUS MEANS CHARACTERIZING SAID SIGNAL

This application claims the benefit, under 35 U.S.C. §365 of International Application PCT/EP2006/063878, filed Jul. 4, 2006, which was published in accordance with PCT Article 21 (2) on Jan. 11, 2007 in French and which claims the benefit of French patent application No. 05 52070, filed Jul. 6, 2005.

The present invention relates to an electric signal producing a device featuring a luminous means characterising said signal and a system composed of the production device and another device connectable to the first.

Some electric devices, preferentially portable, have an autonomous power source such as electric cells or batteries. But electric cells or batteries are expensive and once they are expended, the device is unusable. Fortunately, in the majority of cases, manufacturers have designed a connector enabling an energy identical to that supplied by the autonomous power source to be received, both in terms of current and in terms of voltage. This energy is supplied by an adapter that connects to a plug and supplies a continuous voltage. An adapter is generally constituted by a transformer producing an alternating voltage from a few volts up to ten volts, a rectifying element and a voltage regulator. A cable transmits the energy to a plug that connects to the device. Faced with the multiplicity of devices having an autonomous energy supply but with differing characteristics, manufacturers have designed an adaptable adapter capable of supplying energy according to the device.

Adapters are known having a selector allowing the regulator to be adjusted so that it produces different voltages. Typically, these voltages correspond to multiples of 1.5 volts, which is the voltage of a standard battery, 3 volts, 4.5 volts, 6 volts, 7.5 volts, 9 volts, etc. is therefore found. Before plugging in the adapter, the user must adjust it to supply a suitable voltage. Faced with the multiplicity of devices, the user does not always know the energy characteristics of the supply and must therefore refer to the user manual. At worst, if the badly adjusted adapter emits a voltage above that of the power of the device, the device and/or of the adaptor may be destroyed.

The document US 2003/04281 describes a voltage generator for recharging a portable telephone. The user selects the voltage specified for the telephone using a selector located on the voltage generator module. A colour indicator dependent on the voltage is located on the telephone. The selector has coloured references, in this way the user can verify that the voltage of the generator corresponds to the voltage to be supplied to the telephone. If the voltage generator is separate from the telephone support, the user cannot easily perform this check.

The document U.S. Pat. No. 6,113,281 describes an optical cable for transmitting a luminous beam. The cable receives the light at one end and transmits it at the other end. Using a rotating coloured ring, the user can modify the colour of the light transmitted by the cable. This document does not provide any information how to easily identify a voltage value supplied by a programmable generator.

The document U.S. Pat. No. 5,708,551 describes a voltage generator to supply an external device. A LED diode emits a light whenever the generator detects a connection fault. This document does not provide any information how to easily identify a voltage value supplied by a programmable generator.

There exists therefore a real need to have a programmable voltage generator that can be used anywhere, and that can indicate the voltage thus generated easily evident to the user.

One purpose of this invention is a device to produce an electrical signal having a means to produce said electric signal, the means to adjust a characteristic of said signal, a cable transmitting the signal to a connection element responsible for supplying said signal to another device.

characterized in that the cable also transmits a light signal whose visible characteristic depends upon the value of the adjustable characteristic of the electric signal produced, the connection element having a means of emitting said light signal.

In this way, the user who has the connection element sees the light signal, deduces from it the adjustment performed on the device and verifies whether this adjustment is compatible with the electric signal that the device to be connected can receive.

According to a first improvement, the device comprises a white light source producing a light signal that is modulated by passage through colour filters mechanically integrated into a mobile part of the adjustment means. In this way, the light signal supplied by the white light is coloured as a function of the position of the adjustment means.

According to another improvement, the electric signal produced supplies the means to emit the light signal. Hence, the absence of a light signal informs the user that the device is not functioning. According to one variant, the device contains a light source at the source of the light signal transmitted by the transmission means. This light source is supplied by a second electric signal in which a characteristic varies as a function of the adjustment means. In this way, there is no longer any need to colour the white light, it is coloured directly at the source.

According to another improvement, the device includes a means of detecting a fault in the production of the electric signal. This affects in a visible manner the transmission of the light signal in case of detection of such a fault. In this way, the user can see at the same time the adjustment performed and an indication that the device is working correctly or not.

According to another improvement, the transmission means of the light signal is located on the connection element in such a way that it remains visible whenever said connection element is connected to the device to supply it with said electric signal. Hence, the user sees in the operation if the device is functioning correctly.

According to another improvement, the connection element is removable. The device has a set of several different connection elements. In this way, the user can choose a connector adapted to the device to be connected. According to an improvement, the device is intended to be connected to a plug. In this manner, it can supply a continuous voltage to a device also capable of functioning autonomously. According to an improvement, the device is intended to be connected to a socket embedded in a vehicle.

Another purpose of the present invention relates to a system composed of a production device of an electric signal having a production means of said electric signal, an adjustment means of a characteristic of said signal and a cable transmitting the signal to a first connection element and another device comprising another connection element capable of being connected to the first connection element;

characterized in that this second device has a visual indication, preferably close to said other connection element, providing information on the type of signal to be produced so that the second device functions normally, the cable transmitting a light signal of which a visible characteristic depends upon the value of the adjustable characteristic of the electrical signal produced, the first connection element comprising a transmission means of said light signal.

The invention will be better understood and illustrated by means of the following embodiments and implementations, by no means limiting, with reference to the figures attached in the appendix, wherein:

FIG. 2 shows a explanatory diagram of the different constituents of an adapter according to an embodiment of the invention, FIG. 4 shows a cross-section of the adapter cable.

Figure 1:
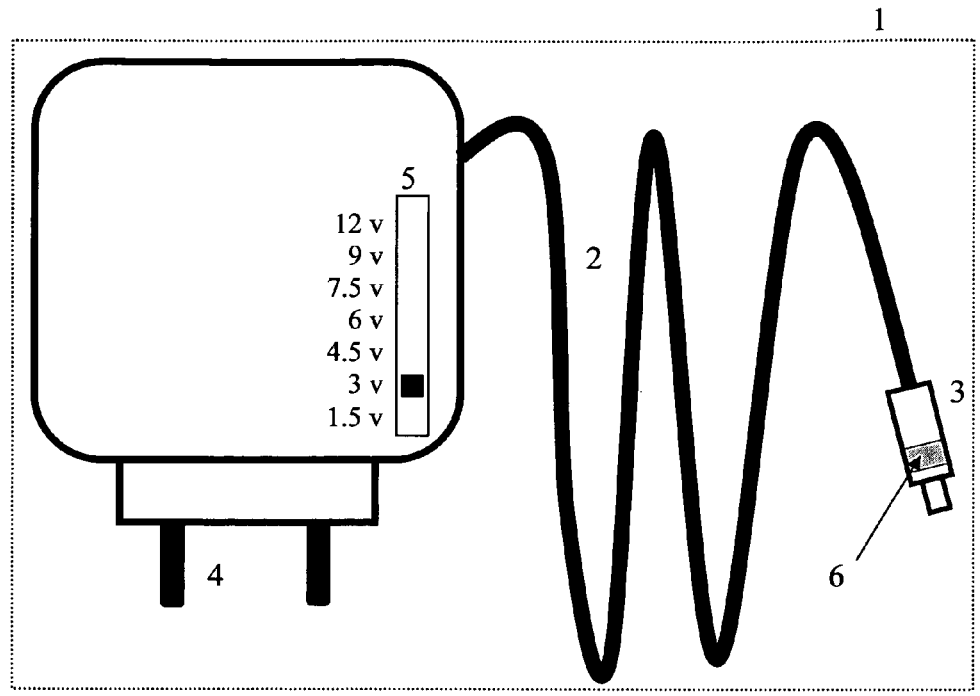
FIG. 1 is a functional diagram of an adapter according to an embodiment of the invention.

FIG. 1 is a functional diagram of an adapter according to an embodiment of the invention. The adapter 1 comprises a box, a cable 2, and a connector 3 at the end of the cable. The box contains a plug 4 to connect to a mains outlet, a transformer, a rectifying element, a regulating circuit—these three elements not shown in the figure are inside the box—and a switch 5 allowing the output voltage to be selected. The switch is the linear type, namely its adjustment comprises a mobile element in a linear groove. It is evident that any other switch, for example circular could suit the present invention. In the illustration, the switch 5 comprises seven positions to select one of the following seven voltages: 1.5 volts, 3 volts, 4.5 volts, 6 volts, 7.5 volts, 9 volts and 12 volts. Once connected to an outlet, the adapter supplies the connector 3 with the voltage selected on the switch 5.

According to an important element of the invention, on the connector 3, there is an element emitting a light signal identifying the voltage applied. According to a first embodiment, this element is a translucent ring 6 arranged in the width of the connector and the colour of which identifies the applied voltage. The table below shows the correspondence between the colour and the voltage:

| | |
|---|---|
| 12 volts | Red |
| 9 volts | Orange |
| 7.5 volts | Yellow |
| 6 volts | Green |
| 4.5 volts | Blue |
| 3 volts | Violet |
| 1.5 volts | White |

Figure 5:
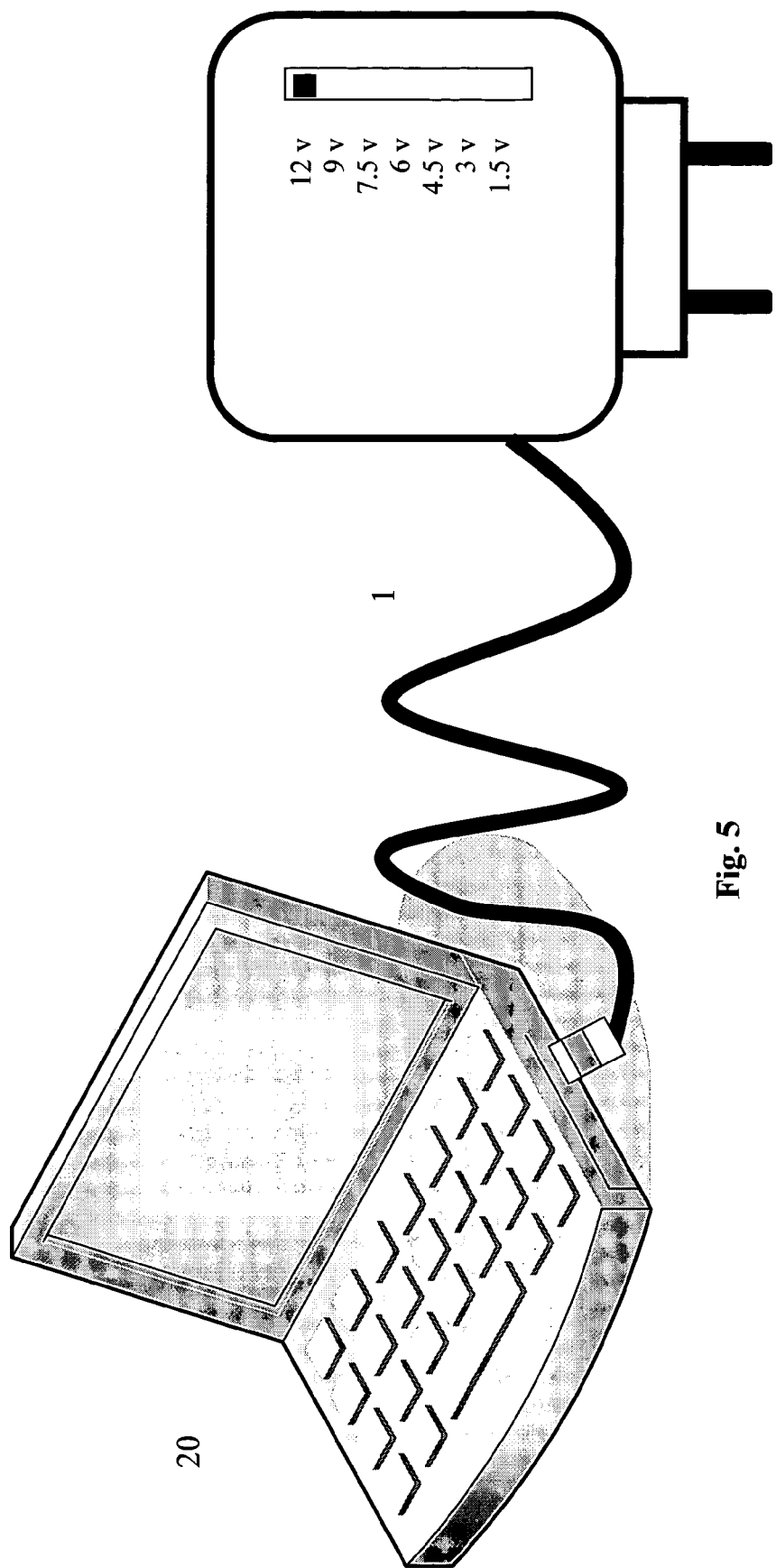
FIG. 5 shows a system composed of the adapter and a device capable of receiving the electrical signal produced by said adapter.

The coloured ring gives the user a visual indication of the value of the voltage applied at the end of the connector. The invention is particularly useful when the box is connected to a socket that is not visible and where as a result the user does not see the adjustment that is actually applied. The invention has another advantage: the user sees that a light appears on the connector 3 and deduces that the adapter is connected. As shown in FIG. 5, the invention concerns both a system composed of the adapter 1 described in FIG. 1 and another device 20 containing a connection element capable of receiving the connection element (3) of the device (1). This second device has a coloured part, for example a ring surrounding the connector. The voltage associated with the colour of this coloured part is compatible with the normal supply voltage of the second device. For example, if the device to be supplied is a Walkman, having three batteries of 1.5 volts, it can be correctly supplied by the adapter 1 on condition that the selector 5 is at 4.5 volts. In this case, the ring 6 emits a blue light. The supply connector of the Walkman comprises a part painted blue, for example a blue coloured ring. FIG. 5 shows the adapter 1 connected to a portable electronic agenda 20 supplied with a voltage of 12 volts.

FIG. 2 shows an explanatory diagram of the different constituents of an adapter according to an embodiment of the invention.

The switch 5 comprises a mobile element 7 including an electrical part and an optical part. The mobile part runs between two guides and can be manipulated by the user by means of a stop. The electrical part is known by the prior art, it permits the selection of the electrical voltage for the regulating circuit. The optical part constitutes a translucent and coloured plastic plate comprising as many coloured areas as there are voltages that can be selected. In the embodiment, the plastic plate comprises seven areas of colours defined in the table above.

An element generating a white light 8, typically an LED, is placed in front of the optical part of the mobile element 7. On the other side, an optical element 9 receives the light rays emitted by the white LED 8 after their transmission through the optical part. Advantageously, this optical element 9 concentrates the light rays to focus them on the optical fibre. The repositioning of the mobile element 7 allows in a same movement a voltage to be selected and the optical part to be moved so that the corresponding coloured area is in front of the white LED 8. The optical element 9 then transmits the light signal to a translucent sheath 10 placed in the cable 2. A variant consists in using an optical fibre within the cable.

The translucent ring 6 of the cylindrical connector 3 is optically linked to the translucent sheath 10.

Figure 3:
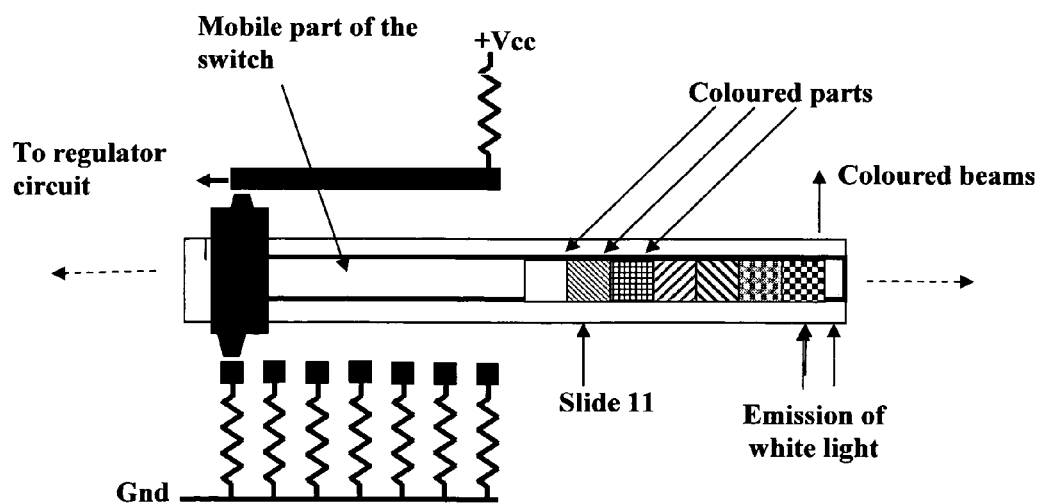
FIG. 3 is a representation of a switch according to an embodiment of the invention.

FIG. 3 shows in a detailed manner the mobile element of the switch. The electrical part consists of two electrodes, one linked to a sliding contact 11 electrically linked by a pull-up resistor to a positive voltage +Vcc, the other has pins 12, each of the pins is linked by a pull-down resistor to the ground of the circuit. Placing pull-up and pull-down resistors in series creates a voltage divider bridge supplying a control voltage for the regulating circuit. According to the embodiment the electrical and optical parts of the mobile element are placed end to end. Other arrangements are possible, for example by arranging them side-by-side.

As a variant, it is the light source 8 that changes colour, for example a tricolour LED gives a light that is either red, yellow or orange. For an adapter having three selection positions, the use of such an LED dispenses with the optical part of the mobile element 4. This variant, however, requires a more sophisticated control at the level of the LED. A third variant consists in that the light source comprises several lamps emitting their light streams towards the optical element 9, these lamps are typically a red LED, a green LED, an orange LED. As for the second variant, the control of the lamps is performed as a function of the position of the switch. Either a single lamp is lit, its colour corresponds to the one identifying the voltage. Or two lamps are lit producing an intermediate colour.

FIG. 4 illustrates a cross-section of cable 2 of the adapter according to a preferred embodiment. The cable is cylindrical and formed of a series of concentric layers, beginning at the centre

- an optical fibre 4.1 conveying the light signal emitted by the white light source and modulated in colour by the coloured areas,
- an electric sheath 4.2 transmitting the positive electric signal from the voltage supply provided,
- an insulating layer 4.3, made of PVC for example,
- an electric sheath 4.4 transmitting the entire electric signal, another insulating layer 4.3 to form the external layer of the cable.

This method of arranging the different layers enables both excellent mechanical strength as well as high immunity from electromagnetic noise. The two conductive sheaths exit the cable in the form of a strand at the level of the optical element 9 and are then soldered onto the circuit supporting the regulating circuit. The two conductive sheaths are split at the level of connector 3 to be crossed by the optical fibre in order to link it with the ring 6. This method does not exclude any other arrangements where for example, the core of the transports the electrical ground. Another method consists in using a cable comprising two electrical wires and one optical fibre.

An improvement consists in that the source of white light is supplied by the voltage selected. To avoid variations in the power of the light, a current generator is placed in series with the source of white light. In this way the user can see by looking at connector 3 whether the adapter is functioning and supplying a voltage.

One variant consists in that the regulating circuit includes a short-circuit detection unit at the level of the +DC output voltage. If the voltage in the cable and on the connector 3 is not the voltage specified by the switch, the surveillance circuit emits a determined electrical signal. If the signal is continuous, the voltage is correct, but if the signal is periodic (with a period of one second or less) a short-circuit or an over-consumption is detected. According to a particularly astute aspect, this alarm signal supplies the source of the white light. Such that if the user sees a flashing at the level of the light signal on the ring 6 of connector 3 then he can deduce from this that there is a fault. According to this variant, the source of the white light is not supplied by the +DC voltage programmed by the user, it is not affected by the short-circuit.

According to another improvement, the ring is arranged in such a way that it remains visible when the connector is pushed into the device to be powered. In this way, the user can see whether the ring emits light and deduce from this that the adapter is functioning correctly or malfunctioning.

One improvement consists in that the connector 3 is removable. In this way, the adapter 1 is supplied with a set of different connectors 3 to adapt to different connection forms to supply power to a device. These connectors 3 all have a translucent ring that is in optical contact with the element of the cable 2 that transports the light signal.

According to an embodiment variant, the adapter is designed to function in a vehicle. The form of the plugs is therefore suitable for introduction in a cigar lighter. The base voltage being a continuous 12 volts, the transformer is replaced by a DC-DC coupling module.

Although the preferred embodiment relates to a device supplying an electrical signal whose voltage is adjusted, the invention also concerns all electrical signals wherein a characteristic can be selected by the user, such as the current or the frequency. Hence, the cables of loudspeakers may have a connector at their ends equipped with a coloured ring indicating whether the audio signals are amplified or not.

The embodiments of the invention cited above were chosen for their practical character. However, it is not possible to give an exhaustive list of all the embodiments that this invention covers. In particular, each step or every means described could be replaced by an equivalent step or means without leaving the framework of the present invention.

The invention claimed is:

1. Device to produce an electric signal, comprising an adjustment means for adjusting a characteristic of said signal, a cable transmitting the signal to a connection element responsible for supplying said signal to another device,
   wherein the cable also transmits a light signal whose visible characteristic depends upon the value of the adjustable characteristics of the electric signal produced, the connection element having an emission means of said light signal.

2. Device according to claim 1, wherein it comprises a white light source producing a light signal that is modulated by passage through color filters mechanically integrated into a mobile part of the adjustment means the light signal thus modulated is transmitted by the transmission means.

3. Device according to claim 1, wherein the electrical signal produced supplies the transmission means of the light signal.

4. Device according to claim 1, wherein it comprises light source supplying the light signal transmitted by the transmission means, the said light source being supplied by a second electrical signal whose characteristics vary as a function of the adjustment means.

5. Device according to claim 1, wherein it comprises a means of detecting a fault in the production of an electrical signal, the said means affecting in a visible manner the emission of the light signal in the case of such a fault.

6. Device according to claim 1, wherein the transmission means of the light signal is located on the connection element in such a way that the connection element remains visible whenever said connection element is connected to the device to supply it with said electric signal.

7. Device according to claim 1, wherein the connection element is removable, the device has a set of several different connection elements.

8. System composed of a device to produce an electrical signal having an adjustment means for adjusting a characteristic of the said signal and a cable transmitting the signal to a first connection element and a second device comprising another connection element capable of connecting to the first connection element, wherein this second device comprises a visual indication, preferably close to said other connection element, providing information on the type of signal to be produced so that the second device functions normally, the cable transmitting a light signal of which a visible characteristic depends upon the value of the adjustable characteristic of the electrical signal produced, the first connection element comprising a transmission means of said light signal.

9. System comprised of an electrical signal production device and a second device receiving said electrical signal according to claim 8, wherein the visual indication on the second device is comprised of a ring surrounding the connector into which the connection element pushed.

* * * * *